United States Patent Office 2,999,050
Patented Sept. 5, 1961

2,999,050
STABLE ETHAVERINE HYDROCHLORIDE SOLUTIONS
Elly T. Margolis, Los Angeles, Calif., assignor to Savage Laboratories, Inc., Bellaire, Tex., a corporation
No Drawing. Filed Oct. 3, 1958, Ser. No. 765,061
5 Claims. (Cl. 167—67)

This invention generally pertains to a novel combination of chemical compounds comprising ethaverine hydrochloride and gentisic acid ethanolamide. More particularly, this invention pertains to concentrated aqueous solutions of ethaverine hydrochloride and gentisic acid ethanolamide.

ETHAVERINE HYDROCHLORIDE

Ethaverine hydrochloride is the recognized generic chemical name for 6,7-diethoxy-1-(3,4-diethoxybenzyl) isoquinoline hydrochloride. It is a synthetic alkaloid and is the tetraethyl homolog of Papaverine hydrochloride and is considered to have the formula $C_{24}H_{29}NO_4HCl$. The synthesis of 6,7-diethoxy-1-(3,4-diethoxybenzyl) isoquinoline is disclosed in U.S. Patent 1,962,224.

Ethaverine hydrochloride is not a narcotic and is nontoxic. Aqueous solutions of ethaverine hydrochloride have been used for many years by the medical profession as an effective agent for relaxing smooth muscle spasms. A number of companies presently market aqueous solutions of ethaverine hydrochloride under various trade names.

LIMITATIONS OF ETHAVERINE HYDROCHLORIDE

One disadvantage of ethaverine hydrochloride is that it has a rather low solubility in water. The practical solubility of ethaverine hydrochloride at room temperature is approximately 25 milligrams per cc. of water, but it is sold commercially in a concentration of only about 15 mg. per cc. so as to guard against precipitation during cold weather and because of other reasons.

Since most physicians consider 60 mg. to 150 mg. of ethaverine hydrochloride to be an effective dosage in order to relax smooth muscle spasms, aqueous injections of between 4 cc. and 10 cc. must be given to a patient at one time. Such large dosages frequently cause pain and discomfort to the patient. It would be highly desirable if the effective dosage could be contained in injections of 1 cc. or 2 cc.

THE INVENTION BROADLY

In accordance with this invention it has been discovered that when gentisic acid ethanolamide is incorporated with ethaverine hydrochloride in aqueous solutions, greater amounts of the ethaverine hydrochloride can be dissolved as compared to the case where no gentisic acid ethanolamide is present. Specifically, it has been found that when between about 1 and 5 grams (and preferably between about 2 and 5 grams) of gentisic acid ethanolamide is present in 100 ml. of an aqueous ethaverine hydrochloride solution, as much as 75 milligrams of ethaverine hydrochloride per ml. of water can be maintained in aqueous solution. The gentisic acid ethanolamide does not deleteriously affect the previously known beneficial therapeutic properties of the ethaverine hydrochloride.

GENTISIC ACID ETHANOLAMIDE

The preparation and properties of gentisic acid ethanolamide are disclosed in U.S. Patent 2,463,462. This compound is generally considered to have the following structural formula:

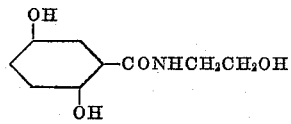

EXAMPLES

The following examples are illustrative of some preferred embodiments of the present invention. It should be understood that these examples are not intended to limit the scope of the invention and that obvious changes may be made by those skilled in the art without changing the essential characteristics and the basic concept of this invention. The parts and percentages are by weight unless otherwise indicated.

Example I

Six grams of ethaverine hydrochloride and three grams of gentisic acid ethanolamide were added to about 85 ml. of water and the mixture stirred with gentle warming until solution was complete. The solution was cooled to room temperature (20–25° C.) and sufficient water was added to bring the volume to exactly 100 ml. At periodic intervals the thus prepared solution was tested for stability and it was found that none of the ethaverine hydrochloride precipitated out of solution.

Example II

Four grams of ethaverine hydrochloride, 2 grams of gentisic acid ethanolamide and sufficient water to bring the volume to exactly 100 ml. were mixed and stirred together with gentle warming until solution was complete. The solution was cooled to room temperature and observed at periodic intervals as a check on stability. The solution remained stable under all temperature conditions between 0° F. and 110° F.

Example III

Two grams of ethaverine hydrochloride, 1 gram of gentisic acid ethanolamide and sufficient water to bring the volume to exactly 100 ml. were mixed and stirred together with gentle warming until solution was complete. The solution was cooled at room temperature and observed at periodic intervals as a check on stability. The solution remained stable under all temperature conditions between 0° F. and 110° F.

Example IV

Seven and one-half grams of ethaverine hydrochloride, five grams of gentisic acid ethanolamide and sufficient water to bring the volume to exactly 100 ml. were mixed and stirred together with gentle warming until solution was complete. The solution was cooled to room temperature and observed at periodic intervals in order to check on stability. The solution remained stable under all temperature conditions between 0° F. and 110° F.

During the stirring step set forth in the above examples either 0.5 gram of chlorobutanol, 2 milliliters of benzyl alcohol or 10 milligrams of thimerosal may be added, and 0.9 gram of sodium chloride may also be added. These ingredients are commonly used in injectable preparations but are not suitable for oral medications. The chlorobutanol, benzyl alcohol and thimerosal are bacteriostatic agents which are generally considered necessary in a multiple dose vial for injectable purposes. The purpose of the sodium chloride is to make the solution isotonic. The solution will then have the same osmotic pressure as that of the blood and other body fluids and consequently will not cause damage to the red blood cells and other tissues.

Ethaverine hydrochloride solutions prepared in accordance with the teachings of this invention should preferably be maintained at or below a pH of about 3.5. A 1% aqueous solution of ethaverine hydrochloride has a pH of about 3.5. If the pH is raised above about 4, the free base will precipitate out of solution. It is desirable to buffer solutions of ethaverine hydrochloride at a pH of 3.5 or less so as to avoid precipitation.

Aqueous solutions of ethaverine hydrochloride and gentisic acid ethanolamide may also be incorporated in suitable syrups and elixirs so that they can be taken orally. It is specifically contemplated in accordance with this invention that aqueous solutions of ethaverine hydrochloride and gentisic acid ethanolamide be incorporated with benzoic acid, methylparaben or propylbaraben (which are bacteriostatic agents) and with sucrose, alcohol, glycerine or flavors (which increase palatability) so as to result in a composition suitable for oral administration.

MISCELLANEOUS

Whereas the instant disclosure has been set forth in rather specific terms, it will be understood that the present invention is not limited to the specific embodiments disclosed but instead is to be interpreted in the light of the well-known patent doctrine of equivalency. In other words, whereas only ethaverine hydrochloride has been disclosed, no invention would be involved in testing other salts of ethaverine to see whether they would or would not work under the conditions prescribed here, and to the extent that such other salts would be found suitable, they are intended to be encompassed here. Likewise, whereas only gentisic acid ethanolamide has been described, no invention would be involved in investigating other homologs, isomers and closely related compounds of gentisic acid ethanolamide for their workability or non-workability and to the extent that such compounds are found workable, it is intended that they should fall within the scope of this patent. In a similar vein, while certain concentrations and ratios of the components have been set forth, no invention would be involved in experimenting with concentrations and ratios outside the specified ranges for their workability or non-workability, and to the extent that such concentrations and ratios are found workable, it is intended that they should fall within the scope of this patent.

What is claimed is:

1. As a new composition of matter, an aqueous solution of ethaverine hydrochloride and gentisic acid ethanolamide, said solution having a pH less than about 3.5, and said components being present in accordance with the ratios established by the following formula:

Water _____ml__ 100
Ethaverine hypochloride _____grams__ 1.5–7.5
Gentisic acid ethanolamide_____do____ 1–5

2. As a new composition of matter, an aqueous solution of ethaverine hydrochloride and gentisic acid ethanolamide, said solution having a pH less than about 3.5, and said components being present in accordance with the ratios established by the following formula:

Water _____ml__ 100
Ethaverine hydrochloride _____grams__ 2.5–7.5
Gentisic acid ethanolamide_____do____ 1–5

3. The composition set forth in claim 2 which additionally contains, on the basis of each 100 ml. of the said solution, about 0.5 gram of chlorobutanol, about 2 milliliters of benzyl alcohol, about 10 milligrams of thimerosal and about 0.9 gram of sodium chloride.

4. A composition as set forth in claim 2 which additionally contains a bacteriostatic agent selected from the group consisting of chlorobutanol, benzyl alcohol and thimerosal, together with sodium chloride as an isotonic agent.

5. The composition suitable for oral administration which comprises the composition as set forth in claim 2 combined with a bacteriostatic agent selected from the group consisting of benzoic acid, methylparaben and propylparaben, together with a palatable carrier medium.

References Cited in the file of this patent
UNITED STATES PATENTS 2,453,452    Huck _____ Mar. 1, 1949

OTHER REFERENCES

U.S. Dispensatory, 25, page 1683, 1955.
J.A. Ph. A., 16: 1, pp. 29–30, January 1955.